[11] 3,612,182

[72] Inventor Philip J. Raifsnider, deceased
 late of Denver, Colo. by Dorothy E.
 Raifsnider, executrix
[21] Appl. No. 853,235
[22] Filed Aug. 25, 1969
[45] Patented Oct. 12, 1971
[73] Assignee Shell Oil Company
 New York, N.Y.

[54] OIL RECOVERY PROCESS
 10 Claims, No Drawings
[52] U.S. Cl. .................................... 166/307,
 166/273
[51] Int. Cl. .................................... E21b 43/22,
 E21b 43/27
[50] Field of Search .......................... 166/273,
 274, 305, 307

[56] References Cited
 UNITED STATES PATENTS

| | | | |
|---|---|---|---|
| 3,135,326 | 6/1964 | Santee | 166/273 X |
| 3,326,287 | 6/1967 | Corrin | 166/273 |
| 3,333,634 | 8/1967 | Townsend et al. | 166/273 |
| 3,335,792 | 8/1967 | O'Brien et al. | 166/273 |
| 3,421,582 | 1/1969 | Fallgatter | 166/273 |
| 3,483,923 | 12/1969 | Darley | 166/273 |
| 3,500,920 | 3/1970 | Raifsnider | 166/273 |

*Primary Examiner*—Stephen J. Novosad
*Attorneys*—George G. Pritzker and J. H. McCarthy

ABSTRACT: In a fluid drive oil recovery process, alternate slugs of acidizing liquid and concentrated, water-swellable, gel-forming surfactant are injected prior to the injection of the drive fluid. The treatment provides improvements such as a more uniform injection profile and increased stability and permeability with respect to an aqueous drive fluid.

OIL RECOVERY PROCESS

BACKGROUND OF THE INVENTION

Although it is well known that oil-immiscible fluids such as water and/or steam are effective flooding or driving fluids for use in the recovery of hydrocarbons from formations by primary, secondary or even tertiary recovery processes, such means present many problems particularly when the formation is water and/or steam sensitive as in the case of clayey formations. In such cases the water sensitive formations when in contact with water, tend to swell and disintegrate with resultant reduction in the permeability of the formation to subsequent water and/or flooding operations utilized in hydrocarbons, e.g., oil recovery processes.

Various means are employed to effect improved stability and permeability of formations to water and/or steam in order to prevent or decrease loss of flooding or driving fluid and to increase its injectivity into formations in order to improve and increase recovery of hydrocarbons from said formation. In the case of water sensitive formations such as clayey formations, the emphasis is to use various means so as to prevent or reduce swelling of the formation, such as by treating said formations with aqueous solutions containing nitrogen base compounds as described in U.S. Pat. No. 2,761,835 and No. 2,761,843 or by contacting the earth formations with oil or with aqueous solutions containing a variety of water-soluble anionic, cationic or nonionic surfactants. These methods have been found to be essentially ineffective particularly when these so-called treated formations are subjected to fresh water-flooding operations in recovery of oil.

An object of the present invention is to provide an improved process for conditioning formations for fluid flooding drive as used in hydrocarbon recovery.

Another object of the present invention is to treat injection wells under conditions of the present invention in order to: (a) increase injection rates, (b) reduce injection pressure and (c) change the injection profile.

Another object of the present invention is to pretreat by a combination of acidizing and chemical treatment, a formation subsequently to be subjected to fluid drive to aid in hydrocarbon recovery.

Still another object of the present invention is to treat a formation with an acidizing fluid and organic chemicals so as to stabilize the formation and improve its permeability.

Still another object of this invention is to stabilize and improve the effective permeability of a subterranean earth formation by a combination of an acid treatment and a treatment with an organic polyoxyalcohol capable of oil wetting the grains of the formation.

Other objects and advantages will be apparent from the description and examples illustrating the present invention.

SUMMARY OF THE INVENTION

It has now been discovered that improvement in waterflood injectivity and injection profile as well as stabilization and preferential permeability to fluid flooding such as water and/or steam flooding of subterranean earth formations can be effectively accomplished by a combination treatment, of the formations prior to fluid flooding or driving, with a pair of liquids comprising (a) an acidizing liquid and (b) an essentially neated or undiluted or high concentrated nonpolymeric water-swellable, gel-forming surfactant having the partial formula $$-X\left[\left(OR\right)_n-OY\right]_m$$

wherein X is oxygen, sulfur or nitrogen and is an organic compound selected from the group consisting of aliphatic alcohols, phenols and their corresponding thiol or mercaptan derivatives and/or amine compounds and where R is an alkylene radical of from one to four carbon atoms, Y is hydrogen or a hydrocarbyl radical, $n$ is an integer of from three to 30, preferably six to 12 carbon atoms, and $m$ is an integer of from one to three. Compounds represented by the formula are essential polyoxylated alcohols, phenols or amines having water-swellable or gel-forming properties when contacted with aqueous solutions. In neat or undiluted form or as concentrates of from at least 60 percent to 99 percent active surfactant materials in a suitable solvent these surfactants are flowable or pumpable at ambient temperatures or at temperatures generally below 80° C. The solvent which may be water, alcohol or a liquid hydrocarbon generally presents less than 40 percent and preferably less than 20 percent of the concentrate mixture.

Briefly stated a process of this invention comprises, prior to water and/or steam flooding, pretreating the formation with a combination of an acidizing liquid and an alcoholic material as defined to obtain synergistic effects of the entire formation treatment for hydrocarbon recovery comprising:

1. injecting a pair of liquids (a) and (b) or (b) and (a) as defined above through injection well or wells penetrating into an oil-production area of an underground formation;
2. injecting an acidizing solution in the formation for a time sufficient to effect removal of any undesirable effects of "-scale-up" perforations;
3. injecting a water to stabilize the well(s);
4. injecting neat or essentially neat alcoholic materials as defined; and,
5. injecting a flooding or driving fluid, e.g., water and/or steam, through the injection well(s), under flooding conditions, to displace hydrocarbons towards a production well(s) from which oil is produced or injecting a thermal fluid such as steam into the formation, thermal soaking the formation and recovering oil thereafter by backflow through the injection well(s) or recovering the oil from a production well(s).

The acidizing liquid can be any suitable acidizing liquid capable of shrinking, agglomerating and dissolving clay particles and can include aqueous solutions containing hydrochloric and/or hydrofluoric acids or fluoride salts available commercially under the name of Mud acids, typical compositions of which are as follows:

A. water containing 10 cc. 15% HCl + 3% $NH_4F$
B. water containing 10 cc. 15% HCl + 3% $NH_4F$ + 1% HAl 45 + 0.2% PEN 5
C. water containing 10 cc. 15% HCl + 0.5% $W_{35}$ + 0.6% A110
D. water containing 10 cc. 15% HCl + 1% HA145 + 0.2% Pen 5
E. water containing 10 cc. 15% HCl + 1% HAl 45
F. water containing 10 cc. 15% HCl + 3% $W_{35}$ + 1.25% A110
G. 410 cc. concentrated HCl + 590 cc. $H_2O$ + 32 grams $NH_4F$ + 2 cc. animal corrosion inhibitor HAl 45 is a corrosion inhibitor (Halliburton)
Pen 5    wetting agent (Halliburton)
$W_{35}$   sludge inhibitor (Dowell)
A110    Corrosion inhibitor (Dowell)

Other acidizing fluids suitable in the process of this invention include those described in U.S. Pats. divided into groups (I) No. 3,249,536; No. 3,251,415; No. 3,254,718; No. 3,283,816; No. 3,354,957; (II) No. 3,167,123; No. 3,236,305; No. 3,252,980; No. 3,252,904 and (III) No. 3,215,199; No. 3,297,090 and No. 3,307,630.

The alcoholic material can be a flowable or pumpable polyoxylated alcohol, mercaptan, or amine having preferably at least three to 10 oxyalkylene units prepared by a number of suitable means such as described in U.S. Pat. No. 2,964,478; No. 3,284,352; No. 3,333,634 and No. 3,355,390. For example, surfactants of this type can be prepared by reacting an alkanol, e.g., $C_{8-30}$ alkanol or corresponding mercaptan having the formula R'-ZH where R' is a $C_{8-30}$ alkyl radical and Z is oxygen or sulfur with ethylene oxide, propylene oxide or butylene oxide to form compounds having the formula R'—Z—(O—R)$_n$OY wherein the symbols R', Z, R, Y and n are as defined above. Instead of using alcohols or mercaptans, alkyl phenols or mono- or polyamines can be used and reacted with alkylene oxide such as ethylene or propylene oxide. Preferred oxyalkylated alkanols useful in neat or concentrated form to pretreat formations can be represented by the general 10 formula (I) represented by 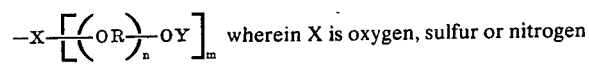 where R is an alkyl radical of 10-15 carbon atoms, the alcohol used in the Ethoxylation being a mixture of alcohols of 10 to 15 carbon atoms. The ethoxylation of the alcohols can be accomplished by means well known in the art. The ethoxylation of primary alcohols to form products represented by formula (1) can be achieved using a strong base of Lewis acid catalysts such as NaOH, KOH, BF$_3$ or SnCl$_2$. Mixed oxyalkylated mixtures of primary alcohols to produce compounds represented by formula (I) can be prepared by the method described in U.S. Pat. No. 3,036,130 or No. 3,101,574 or as described in copending patent application to Tsatsos et al, Ser. No. 661,546, filed Aug. 18, 1967, and illustrated by the following example.

An alkoxylate was prepared employing as the alcohol feed an anhydrous mixture derived from 0.448 g. of sodium hydroxide and 125 g. of mixed C$_{12}$, C$_{13}$, C$_{14}$ and C$_{15}$ primary alcohols, in substantially equal proportions by weight, wherein approximately 80 percent of the alcohol of each carbon number was straight-chain, approximately 10 percent of the alcohol of each carbon number was beta-methyl branched and the remainder of the alcohol of each carbon number consisted of alcohols having beta-ethyl, beta-propyl, beta-butyl and beta-amyl branched structures.

The temperatures of the reactor in which the mixture was maintained was raised by 145±5° C. and kept at that temperature as ethylene oxide was introduced at the rate of about 4—5 g./minute to the stirred reaction mixture. During the approximately one-hour period required to add 166 g. of ethylene oxide, the pressure remained at about 50 p.s.i.g. as the temperature was maintained below 150° C. At the conclusion of the ethylene oxide addition, the stirring was continued until the pressure decreased to about 10 p.s.i.g.

A similar procedure was employed to introduce and react 145 g of propylene oxide at a temperature of about 140° C. and a pressure during addition of 100—120 p.s.i.g. After the propylene oxide addition and after the pressure had decreased to about 30 p.s.i.g, ethylene oxide addition was begun again and carried out as before. After the final reaction period subsequent to the second addition of ethylene oxide, the product mixture was maintained at about 100° C. under a total pressure of 10 mm. to remove volatiles. The product mixture was then cooled to about 70° C. and transferred with the aid of nitrogen pressure into a bottle containing 0.65 g. of acetic acid.

Analysis of the product mixture by its nuclear magnetic resonance spectrum in conjunction with the weights of the alkylene oxide employed indicated a mixture of alcohol alkoxylates having a first block averaging six ethylene oxide units, a second block averaging four propylene oxide units, and a third and a terminal block averaging six ethylene oxide units.

The ethoxylated alcohols are available commercially from Shell Chemical Company under the trade name "Neodol" or from Conoco under the name "Alfol" and others. The "Neodol" identified as Neodol 23-6.5 which is a mixture of C$_{121}$C$_{13}$ alcohol having 6.5 (EO) ethoxylate groups and has the following properties as shown in Table 1.

Table 1

| Detergent Alcohol Carbon Number Range | C$_{12}$-C$_{13}$ |
|---|---|
| Melting Range, °C. | 11–15 |
| Color, APHA (Pt-Co) | 40 |
| Specific Gravity, 50/25° C. | 0.963 |
| Flash Point, Cleveland Open Cup, °F. | 410 |
| Fire Point, Cleveland Open Cup, °C. | 445 |
| Cloud Point, 1% Solution, °C. | 45 |
| Hydroxyl Number, mg. KOH/gm. | 116 |
| Water (Karl Fischer), %w | 0.3 |
| Acid Value, eq/100 g. | Less than 0.001 |
| Odor | Mild |

Other ethoxylated alcohols useful in aiding in oil recovery are shown in table 2 and have the following properties where EO is -CH$_2$CH$_2$O-radical.

Table 2

| Analyses | Ethoxylates C$_{12}$-C$_{13}$ 3 EO | C$_{12}$-C$_{13}$ 7.5 EO | C$_{12}$-C$_{13}$ 9 EO |
|---|---|---|---|
| Ash, %w | 0.2 max | 0.01 max | 0.01 max |
| Color, APHA | 100 max | 75 max within 0.5 water used | 75 max within 0.5 water used |
| pH, 1% Solution | 5.5–6.5 | water used | water used |
| Acid Value, eq/100 g. | 0.004 max | 0.0003 max | 0.0003 max |

Conoco "Alfol" alcohols such as "Alfonic" 1012-6 or 1218-6 having the structural formula: CH$_3$—(CH$_2$)$_x$—CH$_2$—(OCH$_2$CH$_2$)$_n$—OH where $x$ is 8–16 and $n$=5–8. Thus, Alfonic 1012-6 is a C$_{10-12}$ primary alcohol containing six ethylene oxide units and 1218-6 is a C$_{12-18}$ primary alcohol containing six ethylene oxide units. The alkoxylated alcohols can be modified by reacting the alcohols with alkylene amines or sulfides so that some of the alkylene units in the molecule would also contain nitrogen and/or sulfur atoms and include polyalkylene amine-alkyl derivatives or mixtures of polyalkylene amines and ethoxylated alcohols as noted in U.S. Pat. No. 3,347,789.

Polyoxylated alkylene phenols or amines prepared by the methods mentioned above are available commercially from Rohm and Haas under the trade name of "Triton X-100" [alkylphenol (ethylene oxide)] reaction product or by Armour Chemical Company under the trade name "Ethomeens" having the formula R''N

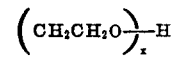

where R is an alkyl radical, $x$ and $y$ are integers or "Ethomids" having the formula

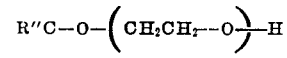

or "Ethofats" having the formula R''C-O-(CH$_2$CH$_2$—O)H which compounds are fully described in Armour's bulletin entitled "Ethomeens, Ethomids and Ethofats.".

The ethoxylated material can be sulfated if desired such as the "Neodols" as identified above can be sulfated by reacting a C$_{12}$-C$_{15}$ (3 EO) alcohol with chlorosulfonic acid at around 25° C.

Water-soluble surfactants of the above type when injected into a formation tend to temporarily and selectively plug the more permeable portions of the formation, forming a water-swellable or gellable plug when contacted with connate water or with an aqueous drive fluid. Formations thus treated when thereafter subjected to a waterflood lower the surface tension at the water-oil interface and also lower the injection pressure resulting in increased oil and water recovery.

In combination with the alcohol material certain sequestering agents can be used of which preferred are the polyphosphate salts such as alkali metal polyphosphate salt, e.g., Na, K or Li Tri- or hexametaphosphates or thiophosphates, preferred being the sodium tripolyphosphate and hexamethphosphate. Also, mixtures of mixed salts of polyphosphates can be used such as Na-Mg polyphosphate or Na-Ca polyphosphate.

PREFERRED EMBODIMENT OF THE INVENTION

An injection well was treated with three drums of NEODOL 23-6.5 (Table 1 displaced into the oil recovery zone. A radioactive tracer survey was made on this zone prior to treatment to establish the injection profile. Results of the survey radioactive tracer survey was made on this zone prior to treatment to establish the injection profile. Results of the survey made at 710 B/D at 2,900 p.s.i.g. indicated 13 percent of the fluid (92 B/D) was entering the perforations at 9,053–9,065 feet and 87 percent of fluid (618 B/O) was entering perforations at 9,132–9,140 feet.

After NEODOL 23-6.5 application, the well was resurveyed at 1,350 B/D and 2,400 p.s.i.g. This second survey showed 35 percent of fluid (469 B/D) entering perforations at 9,053–9,065 feet and 65 percent of fluid (871 B/D) at 9,132–9,140 feet. The viscous NEODOL 23-6.5 apparently formed a temporary plug in the more permeable zone and resulted in a surfactant washing of the tighter zone.

Another injection well was treated with 1,000 gallons of 15 percent HCl followed in eight hours by 110 gallons of NEODOL 23-6.5. The survey run prior to treatment showed injection of 275 B/D at 2,900 p.s.i.g. After treatment the survey indicated injection of 760 B/D at 1,700 p.s.i.g.

The above procedure was repeated except that after treating the formation with 15 percent HCl as described above, the chemical injection method used was as follows: Three hundred pounds per day of sodium tripolyphosphate was injected into the formation for eight consecutive days. Next, 440 pounds per day of nonionic surfactant $C_{12}$–$C_{13}$ alcohol containing 6.5 EO units such as "Neodol" 23-6.5 was thereafter injected for five consecutive days. The addition of this surfactant was accomplished in about 15 minutes, thus resulting in an extremely high, short term concentration exceeding one percent in the injection water for 1 hour. This was followed by 300 pounds per day of tripolyphosphate for 5 days.

The treatment was repeated as described above and a continuing addition of 50 pounds per day of tripolyphosphate was made for 4 months.

Injection pressure in this flood prior to treatment was 950 p.s.i.g. Immediately after the surfactant was added, the injection pressure fell to 850 p.s.i.g. After 1 month's operation, and without additional wetting agent, a minimum injection pressure of 700 p.s.i.g. was realized. After 4 months' operation, injection pressures ranged from 775 to 825 p.s.i.g. After 10 months, injection pressures are nearing the initial readings 950 p.s.i.g.

The pressure reduction reflects displacement of additional oil from a previously watered-out producing well when it was reactivated by the process of this invention. The well tested had been shut-in 6 months prior to this test when its production had declined to 4 bbls oil and 250 bbls water per day and when returned to production, the well started producing at the rate of 6 bbls oil/day.

Generally the drive fluid used is water, but steam, miscible flooding fluids and mixtures such as water-steam flood drives can be used once the formation has been pretreated with heat or undiluted surfactants as described. The fluid drives can contain thickeners, viscosity increasers, pushers and the like, e.g., polyacrylamides and derivatives, polyalkylene oxide polymers, polyvinyl-alcohol sulfonate and the like some of which are described in U.S. Pat. No. 3,341,319; No. 3,332,904; No. 3,254,719; No. 3,367,418; No. 3,368,620 and No. 3,370,649.

It is understood that various changes in the details described to explain the invention can be made by persons skilled in the art within the scope of the invention as expressed in the appended claims.

I claim as my invention:

1. A process for improving oil recovery from earth formations comprising first treating the oil bearing zones of said formations with an acidizing composition, followed by treatment with undiluted water-swellable gel-forming surfactant having the partial formula $-X-\left[\left(OR\right)_n-OY\right]_m$ where X is selected from the elements of oxygen, sulfur and amine, R is an alkylene radical, Y is selected from the group consisting of hydrogen, hydrocarbyl radical and a cation, n is an integer of three to 30 and m is an integer of one to three and thereafter treating the formation with a drive fluid.

2. The process of claim 1 wherein the acidizing solution is a HCl solution, the surfactant is a polyethoxylated primary alcohol having from eight to 20 carbon atoms and at least three ethoxy units in the molecule and the drive fluid is water.

3. The process of claim 2 wherein the alcohol is a $C_{12}$–$C_{13}$ primary alcohol having three to 10 ethoxy units in the molecule.

4. The process of claim 2 wherein the alcohol is a $C_{12}$–$C_{13}$ primary alcohol having about 6.5 ethoxy units in the molecule.

5. The process of claim 4 wherein contained in the water drive is present a small amount of a polymeric water-soluble thickener.

6. The process of claim 1 wherein the surfactant is a polyethoxylated alkyl phenol having at least six ethoxy units in the molecule and the drive fluid is water.

7. The process of claim 1 wherein the surfactant is a polyethoxylated amine and the drive fluid is water.

8. A process for improving oil recovery from earth formations, comprising: first treating the oil bearing zones of said formations with an acidizing composition, followed by treating them with a high concentration solution of water-swellable, gel-forming surfactant having the partial formula $-X-[(OR)_n OY]_m$ where X is selected from the elements of oxygen, sulfur and amine, R is an alkylene radical, Y is selected from the group consisting of hydrogen, hydrocarbyl radical and a cation, n is an integer of three to 30 and m is an integer of one to three in an aqueous solution containing a water soluble phosphate and thereafter treating the formations with a drive fluid.

9. The process of claim 8, wherein the polyphosphate is sodium tripolyphosphate and is injected as an aqueous solution into the oil bearing zone of the formation separately and after the alcoholic surfactant solution.

10. The process of claim 9 wherein the polyphosphate solution is injected prior to the alcoholic surfactant solution.